US009836322B1

(12) United States Patent
Shekhar et al.

(10) Patent No.: US 9,836,322 B1
(45) Date of Patent: *Dec. 5, 2017

(54) METHODS AND APPARATUS FOR VIRTUALIZING SWITCH CONTROL PLANE ENGINE

(71) Applicant: Juniper Networks, Inc., Sunnyvale, CA (US)

(72) Inventors: Ravi Shekhar, Sunnyvale, CA (US); Quaizar Vohra, Cupertino, CA (US); Michael O'Gorman, San Carlos, CA (US); Aleksandar Ratkovic, Palo Alto, CA (US); Jean-Marc Frailong, Los Altos Hills, CA (US); Shesha Sreenivasamurthy, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,028

(22) Filed: Oct. 27, 2016

Related U.S. Application Data

(63) Continuation of application No. 14/621,878, filed on Feb. 13, 2015, now Pat. No. 9,509,637, which is a continuation of application No. 13/435,919, filed on Mar. 30, 2012, now Pat. No. 8,958,420.

(51) Int. Cl.
*H04L 12/24* (2006.01)
*G06F 9/455* (2006.01)

(52) U.S. Cl.
CPC .. *G06F 9/45558* (2013.01); *G06F 2009/4557* (2013.01); *G06F 2009/45595* (2013.01)

(58) Field of Classification Search
CPC . H04L 12/4641; H04L 12/50; H04L 41/0896; H04L 49/25
USPC .................. 370/254, 384, 386; 709/223, 226
See application file for complete search history.

(56) References Cited

U.S. PATENT DOCUMENTS

| | | |
|---|---|---|
| 2003/0182233 A1 | 9/2003 | Mocek et al. |
| 2007/0266389 A1 | 11/2007 | Ganguly |
| 2010/0165876 A1 | 7/2010 | Shukla et al. |
| 2012/0269053 A1 | 10/2012 | Yu et al. |
| 2012/0303835 A1 | 11/2012 | Kempf et al. |
| 2013/0042003 A1 | 2/2013 | Franco et al. |

FOREIGN PATENT DOCUMENTS

| | | |
|---|---|---|
| EP | 1298861 B1 | 9/2011 |
| WO | 0113613 A1 | 2/2001 |

*Primary Examiner* — Mark Rinehart
*Assistant Examiner* — Natali N Pascual Peguero
(74) *Attorney, Agent, or Firm* — Cooley LLP

(57) ABSTRACT

In some embodiments, an apparatus includes a scheduler disposed at a control device of a switch fabric system. The scheduler is configured to receive a control plane request associated with the switch fabric system having a data plane and a control plane separate from the data plane. The scheduler is configured to designate a control plane entity based on the control plane request and state information of each control plane entity from a set of control plane entities associated with the control plane and instantiated as a virtual machine. The scheduler is configured to send a signal to a compute device of the switch fabric system in response to the control plane request such that the control plane entity is instantiated as a virtual machine at the compute device.

20 Claims, 4 Drawing Sheets

500

Receive a control plane request associated with a switch fabric system having a data plane and a control plane separate from the data plane.
502

Designate a control plane entity based on the control plane request and state information of each control plane entity from a set of control plane entities associated with the control plane and instantiated as a virtual machine.
504

Send a signal to a compute device of the switch fabric system in response to the control plane request such that the control plane entity is instantiated as a virtual machine at the compute device.
506

FIG. 5

METHODS AND APPARATUS FOR VIRTUALIZING SWITCH CONTROL PLANE ENGINE

CROSS-REFERENCE TO RELATED APPLICATIONS

This application is a continuation of, and claims priority to and the benefit of, U.S. patent application Ser. No. 14/621,878, filed Feb. 13, 2015 (now U.S. Pat. No. 9,509, 637) and entitled "Methods and Apparatus for Virtualizing Switch Control Plane Engine," which in turn is a continuation of, and claims priority to and the benefit of, U.S. patent application Ser. No. 13/435,919, (now U.S. Pat. No. 8,958, 420) entitled "Methods and Apparatus for Virtualizing Switch Control Plane Engine," filed Mar. 30, 2012. The contents of the aforementioned applications are herein by reference in their entireties.

BACKGROUND

Some embodiments described herein relate generally to managing a control plane of a switch fabric, and, in particular, to methods and apparatus for designating and causing instantiation of distributed switch control plane engines as virtual machines.

Some known switch fabrics implement a control plane separately from a data plane. In such know switch fabrics, services associated with the control plane and services associated with the data plane are typically implemented at different physical devices. Such switch fabrics, however, typically do not instantiate services as virtual machines. Thus, distribution of the services is limited within the physical devices of the control plane and the data plane.

Some other known switch fabrics instantiate servers, applications and functions as virtual machines to overcome the limitation of physical devices. Such known switch fabrics, however, typically apply the virtualization approach within the data plane, but not within the control plane.

Accordingly, a need exists for virtualizing control plane engines for a control plane that is separate from a data plane in a switch fabric.

SUMMARY

In some embodiments, an apparatus includes a scheduler disposed at a control device of a switch fabric system. The scheduler is configured to receive a control plane request associated with the switch fabric system having a data plane and a control plane separate from the data plane. The scheduler is configured to designate a control plane entity based on the control plane request and state information of each control plane entity from a set of control plane entities associated with the control plane and instantiated as a virtual machine. The scheduler is configured to send a signal to a compute device of the switch fabric system in response to the control plane request such that the control plane entity is instantiated as a virtual machine at the compute device.

BRIEF DESCRIPTION OF THE DRAWINGS

FIG. 5 is a flow chart illustrating a method for instantiating a control plane entity, according to an embodiment.

DETAILED DESCRIPTION

Figure 1:
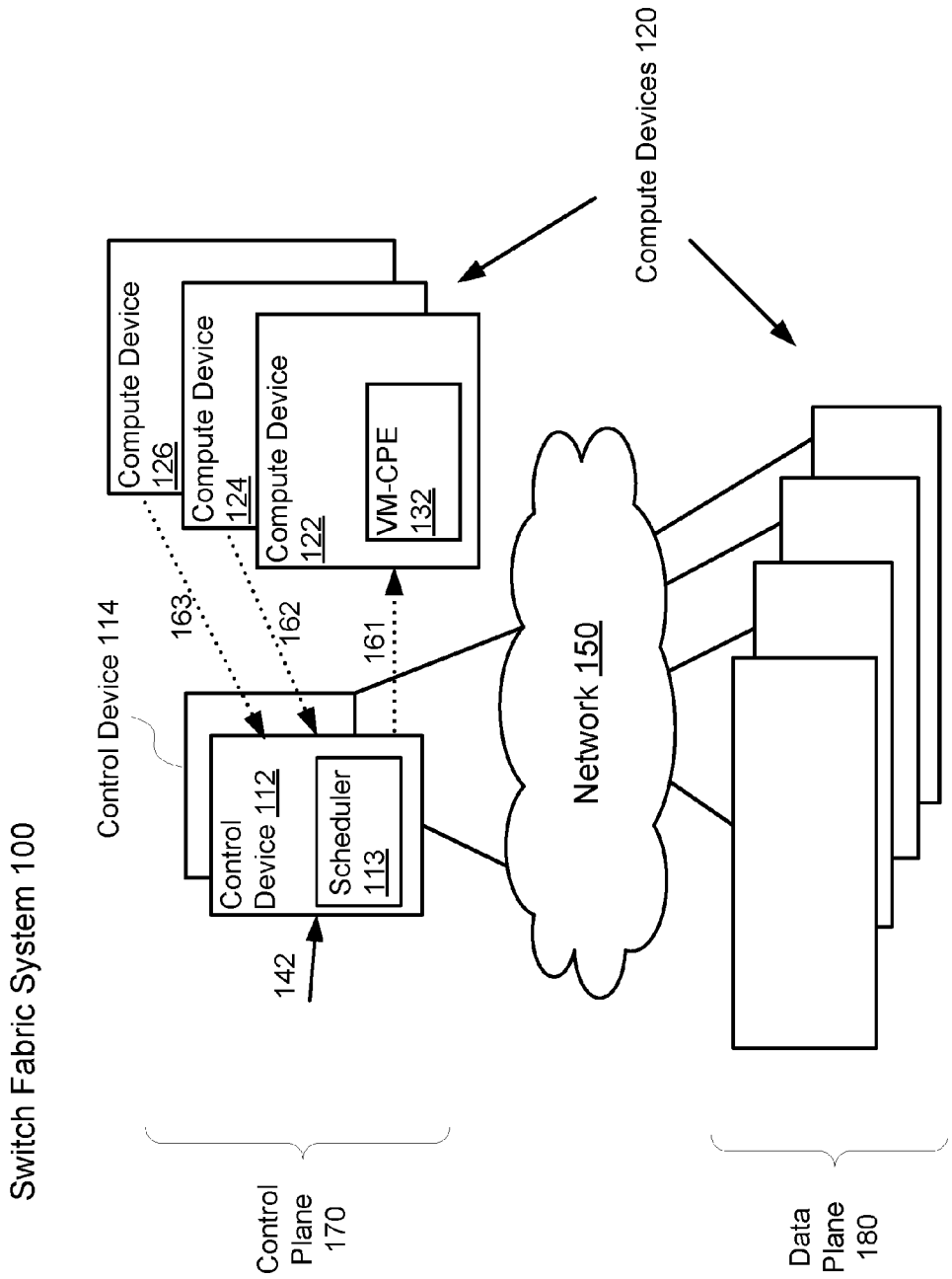
FIG. 1 is a schematic illustration of a switch fabric system, according to an embodiment.

In some embodiments, an apparatus includes a scheduler disposed at a control device of a switch fabric system. The scheduler is configured to receive a control plane request associated with the switch fabric system having a data plane and a control plane separate from the data plane. The scheduler is configured to designate a control plane entity based on the control plane request and state information of each control plane entity from a set of control plane entities associated with the control plane and instantiated as a virtual machine. In some embodiments, each control plane entity from the set of control plane entities can be associated with an affinity attribute value and an anti-affinity attribute value. In such embodiments, the scheduler can be configured to designate the control plane entity such that the control plane entity is associated with an affinity attribute value and an anti-affinity attribute value.

The scheduler is configured to send a signal to a compute device of the switch fabric system in response to the control plane request such that the control plane entity is instantiated as a virtual machine at the compute device. In some embodiments, the scheduler can be configured to select, before the signal is sent, the compute device from a set of compute devices and not remaining compute devices from the set of compute devices. Such a selection can be performed based, at least in part, on the affinity attribute value and the anti-affinity attribute value of the control plane entity and of each control plane entity from the set of control plane entities.

In some embodiments, the control plane entity is a first control plane entity, and the set of control plane entities includes a second control plane entity. The scheduler can be configured to designate the first control plane entity such that the first control plane entity is associated with a priority attribute value. The second control plane entity is also associated with a priority attribute value. One of the priority attribute value of the first control plane entity or the priority attribute value of the second plane entity is a primary value and the remaining priority attribute value of the first control plane entity or the priority attribute value of the second control plane entity is a secondary value.

In some embodiments, the compute device is a first compute device, and the set of control plane entities includes a first control plane entity having a priority attribute value and a second control plane entity having a priority attribute value lower than the priority attribute value of the first control plane entity. The scheduler can be configured to receive a signal indicating that a second compute device associated with the first control plane entity is not operative. The scheduler can be configured to modify the priority attribute value of the second control plane entity in response to such a signal.

In some embodiments, the compute device is a first compute device, and the set of control plane entities includes a first control plane entity having a priority attribute value, a second control plane entity having a priority attribute value lower than the priority attribute value of the first control plane entity, and a third control plane entity having a priority attribute value lower than the priority attribute value of the second plane entity. The scheduler can be configured to receive a signal indicating that a second compute device associated with the first control plane entity is not operative. The scheduler can be configured to increase the priority attribute value of the second control plane entity and increase the priority attribute value of the third control plane entity in response to such a signal.

In some embodiments, the compute device is a first compute device, the signal is a first signal, and the control plane entity is a first control plane entity. The set of control plane entities includes a second control plane entity. The virtual machine instantiated for the second control plane entity is located at a second compute device of the switch fabric system before the scheduler receives the control plane request. The scheduler can be configured to send a second signal to the second compute device of the switch fabric system in response to the control plane request and based on the state information such that the virtual machine instantiated for the second control plane entity is moved to a third compute device of the switch fabric system.

In some embodiments, the signal is a first signal, and each control plane entity from the set of control plane entities is associated with a set of attribute values before the scheduler receives the control plane request. The scheduler can be configured to modify at least one attribute value for a control plane entity from the set of control plane entities in response to the control plane request and based on the state information.

As used herein, a module can be, for example, any assembly and/or set of operatively-coupled electrical components, and can include, for example, a memory, a processor, electrical traces, optical connectors, software (executing or to be executed in hardware) and/or the like.

As used herein, the singular forms "a," "an" and "the" include plural referents unless the context clearly dictates otherwise. Thus, for example, the term "a memory" is intended to mean a single memory device or a combination of memory devices associated with a storing function.

FIG. 1 is a schematic illustration of a switch fabric system 100, according to an embodiment. The switch fabric system 100 includes a control plane 170 and a data plane 180. The control plane 170 includes a control device 112, a control device 114, and a set of compute devices 120 (e.g., compute devices 122, 124 and 126). The data plane 180 includes a set of compute devices 120. Although shown in FIG. 1 as the control plane 170 and the data plane 180 including different sets of compute devices 120, in some embodiments, one or more compute devices 120 can be included in both the control plane 170 and the data plane 180 (e.g., a portion of a compute device 120 can be associated with the control plane 170 and another portion of that compute device 120 can be associated with the data plane 180).

As used herein, the term "control plane" refers to portions of the components, modules, cables, processors, and/or switches of a switch fabric system (e.g., the switch fabric system 100) through which control signals are transmitted, defined, received, and/or the like. Said another way, the control plane of a switch fabric system is a portion of the switch fabric system that controls the operation of the switch fabric system. Control signals can include any signal configured to control and/or monitor the operation of the switch fabric system. For example, control signals can control and/or monitor the routing of data signals through the switch fabric. A control signal can include, for example, handshaking information, packet-forwarding information, routing protocols information, bridging protocols information, error recovery information, routing tables, switch tables, topology-discovery information, and/or the like. In the example of FIG. 1, the control plane 170, including the control devices 112, 114 and the compute devices 122, 124, 126, can be configured to control the operation of the switch fabric system 100.

As used herein, the term "data plane" refers to the portions of the components, modules, cables, processors, and/or switches of a switch fabric system (e.g., the switch fabric system 100) through which data signals are transmitted, defined, received, and/or the like. Data signals can include any signal that contains data to be sent between a first network device and/or storage device (e.g., a compute device 120) operatively coupled to the switch fabric system and a second network device and/or storage device operatively coupled to the switch fabric system. Data signals are different than control signals in that data signals are the signals to be transmitted through the switch fabric system and are not used to control and/or monitor the switch fabric system. In some embodiments, for example, a data signal can include a data packet and/or a portion of a data packet such as a cell, and can carry information originated outside of the switch fabric and delivered through the switch fabric to a location outside of the switch fabric.

In some embodiments, if a portion of a component, module, cable, processor, and/or switch transmits, defines, and/or receives both control signals and data signals for a switch fabric system, that portion of the component, module, cable, processor, and/or switch is part of the control plane of the switch fabric system with respect to the control functionality and part of the data plane of the switch fabric system with respect to the data functionality. In some embodiments, a signal, packet, and/or cell includes both a data portion and a control portion. In such embodiments, the portions of a switch fabric system that transmit, define, and/or receive the data portions of the signal are part of the data plane of the switch fabric system. Similarly, the portions of the switch fabric system that transmit, define, and/or receive the control portions of the signal are part of the control plane of the switch fabric system.

The control devices 112 and 114 can be any device configured to control and monitor the operation of other devices (e.g., compute devices 120) of the switch fabric system 100. In some embodiments, the control devices 112 and 114 can be, for example, a server, a workstation and/or the like. The control devices 112 and 114 can be operatively coupled to the compute devices 120 that are included in the control plane 170 (e.g. compute devices 122, 124 and 126). As shown in FIG. 1, the control devices 112 and 114 each includes a scheduler (e.g., the scheduler 113 within the control device 112), which is configured to designate control plane entities and then instantiate the designated control plane entities as virtual machines at the compute devices 120 included in the control plane 170. A control plane entity that is instantiated as a virtual machine at a compute device can be denoted as a VM-CPE executed in that compute device (e.g., the VM-CPE 132 executed in the compute device 122 in FIG. 1). Details of the structure, operation and functionalities of the control devices 112 and 114 are further described with respect to FIG. 2 below.

The compute devices 120 can be any device configured to send data (e.g., data packets, data cells, etc.) to and/or receive data from, for example, other compute devices 120. Compute devices 120 can be, for example, servers, storage devices, switching devices, workstations, peripheral processing devices and/or the like. The compute devices 120 included in the data plane 180 can be configured to receive control signals from the control devices 112, 114 and/or other compute devices 120 included in the control plane 170

(e.g., the compute devices 122, 124 and 126), such that the compute devices 120 included in the data plane 180 can be configured to operate with respect to transmitting data signals based on the instructions and/or commands carried in the received control signals. Additionally, the compute devices 120 included in the control plane 170 (e.g., the compute devices 122, 124 and 126) can be configured to instantiate CPEs as VMs based on control signals (e.g., signal 161) received from the control devices 112 and 114. Furthermore, such compute devices 120 can be configured to send control signals (e.g., signal 162, 163) to the control devices 112 and 114 reporting any change in the VM-CPEs executed in these compute devices 120. Details of the structure, operation and functionalities of the compute devices 120 included in the control plane 170 are further described with respect to FIG. 3 below.

In some embodiments, as shown in FIG. 1, the control devices 112 and 114 can be operatively coupled to the compute devices 120 of the data plane 180 via a network 150. The network 150 can be, for example, a local area network (LAN), a wide area network (WAN), a metropolitan area network (MAN), a campus network, a fiber optical network, the Internet, etc. Thus, control signals can be forwarded by switching devices within the network 150 between the control devices 112, 114 and the compute devices 120 of the data plane 180. In some embodiments, although not shown in FIG. 1, the control devices 112 and 114 can be operatively coupled to the compute devices of the control plane 170 via a network. In some embodiments, compute devices 120 can be operatively coupled to each other via other switching devices or switching modules. In some embodiments, the network can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

Figure 2:
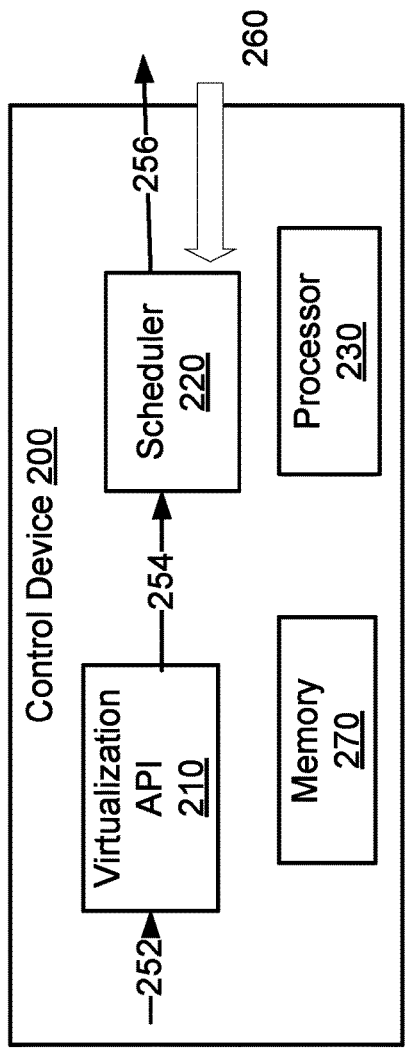
FIG. 2 is a block diagram of a control device, according to an embodiment.

FIG. 2 is a block diagram of a control device 200, according to an embodiment. The control device 200 can be structurally and functionally similar to the control devices 112 and 114 shown and described with respect to FIG. 1. Furthermore, the control device 200 can be associated with a control plane within a switch fabric system that is similar to the control plane 170 within the switch fabric system 100 in FIG. 1. In some embodiments, one or more other control devices similar to the control device 200 can be included in the control plane, and have a similar function as the control device 200. As shown in FIG. 2, the control device 200 includes a virtualization application programming interface (API) 210, a scheduler 220, a memory 270, and a processor 230. In some embodiments, the control device 200 can include more modules and/or components than those shown in FIG. 2, which are associated with controlling and/or monitoring operation of other devices (e.g., compute devices) within the switch fabric system.

The memory 270 can be, for example, a random-access memory (RAM) (e.g., a dynamic RAM, a static RAM), a flash memory, a removable memory, and/or so forth. In some embodiments, the memory 270 can include and/or store, for example, a database, process code, application code, method code, virtual machine(s), and/or some other software modules (stored and/or executing in hardware) or hardware modules associated with the controlling and/or monitoring functions performed by the control device 200. In such embodiments, instructions and/or methods associated with those controlling and/or monitoring functions can be stored within the memory 270 and executed at the processor 230.

The processor 230 can be any processor configured to, for example, write data into and read data from the memory 270, and execute the instructions and/or methods stored within the memory 270. Furthermore, the processor 230 can be configured to control operation of the modules and/or components of the control device 200, including the virtualization API 210 and the scheduler 220. In some embodiments, under the control of the processor 230 and based on the instructions and/or methods stored within the memory 270, the virtualization API 210 and the scheduler 220 can be configured to control and/or monitor operation of other devices in the switch fabric system, as described below.

The scheduler 220 and the virtualization API 210 can each include a combination of hardware and/or software (stored and/or executing in hardware) capable of performing one or more specific functions associated with controlling and monitoring operation of the compute devices in the switch fabric system. Specifically, as described in detail below, the scheduler 220 and the virtualization API 210 can be configured to designate CPEs, and then cause or signal the designated CPEs to be instantiated as VM-CPEs at corresponding compute devices within the control plane of the switch fabric system. In some embodiments, the scheduler 220 and the virtualization API 210 can include, for example, a field-programmable gate array (FPGA), an application specific integrated circuit (ASIC), a digital signal processor (DSP), and/or the like.

In some embodiments, the virtualization API 210 can be configured to receive a request associated with providing a control service (e.g., a routing protocol, a packet-forwarding scheme, an error recovery mechanism, etc.) by the control plane, via the signal 252 shown in FIG. 2. In some embodiments, such a request can be sent from a component of the control plane, such as a component of the control device 200 (e.g., other than the virtualization API 210 and the scheduler 220), or a device other than the control device 200 (e.g., another control device, a compute device). In some other embodiments, such a request can be received as a command or instruction from, for example, a network administrator or operator of the switch fabric system.

In response to receiving such a request, the virtualization API 210 can be configured to transform the request into a control plane request associated with providing the corresponding control service. Similarly stated, the virtualization API 210 can be configured to produce, based on the received request, a control plane request that can be properly interpreted by the scheduler 220. The virtualization API 210 can then be configured to send the control plane request to the scheduler 220 via the signal 254 shown in FIG. 2.

In response to receiving the control plane request from the virtualization API 210, the scheduler 220 can be configured to designate a control plane entity associated with providing the requested control service, and then send a signal 256 to a corresponding compute device (not shown in FIG. 2) such that the designated control plane entity can be instantiated as a virtual machine at the corresponding compute device. Similarly, the scheduler 220 can be configured to schedule de-instantiation of VM-CPEs at compute devices in the control plane of the switch fabric system. For instantiation at a compute device of a VM-CPE, the VM-CPE is assigned to that compute device to be executed; and for de-instantiation at a compute device a VM-CPE, the VM-CPE is not anymore assigned to that compute device to be executed. In some embodiments, the scheduler 220 can be configured to send a signal (e.g., the signal 256) associated with instantiating or de-instantiating a VM-CPE to a scheduler agent of a compute device (e.g., the scheduler agent 310 of the compute device 300 in FIG. 3). As a result, the scheduler agent can be configured to execute or suspend executing the VM-CPE at that compute device.

As described herein, the scheduler 220 can be configured to manage operation of one or more VM-CPEs associated with the control plane. In some embodiments, the scheduler 220 together with one or more other schedulers of the control plane can be configured to collectively manage operation of all the VM-CPEs associated with the control plane. In some embodiments, in addition to sending control signals to the compute devices in the control plane, the scheduler 220 can be configured to receive from the compute devices control signals (e.g., the signal 260 in FIG. 2) that contain state information associated with the VM-CPEs executed at those compute devices. As a result, the scheduler 220 can be configured to monitor the operation of the compute devices with respect to the VM-CPEs, and act accordingly based on the received information, as described in detail with respect to FIG. 4.

In some embodiments, although not shown in FIG. 2, a virtualization API of a control device can be configured to cause instantiation, delete, traverse, and/or update VM-CPEs. Such a virtualization API can perform the functionalities of both the virtualization API 210 and the scheduler 220 as described above. In such embodiments, the virtualization API can include a scheduler module configured to cause and/or schedule the instantiation and de-instantiation of the VM-CPEs.

Figure 3:
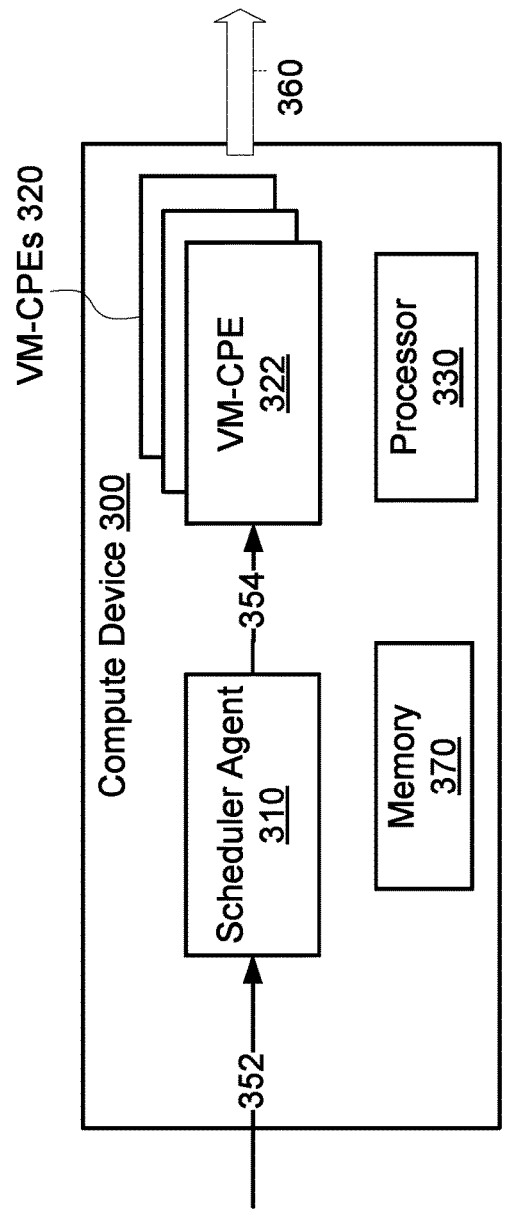
FIG. 3 is a block diagram of a compute device, according to an embodiment.

FIG. 3 is a block diagram of a compute device 300, according to an embodiment. The compute device 300 can be structurally and functionally similar to the compute devices 122, 124 and 126 shown and described with respect to FIG. 1. Furthermore, the compute device 300 can be associated with a control plane within a switch fabric system that is similar to the control plane 170 within the switch fabric system 100 in FIG. 1. In some embodiments, one or more other compute devices similar to the compute device 300 can be included in the control plane of the switch fabric system, and have a similar function as the compute device 300. As shown in FIG. 3, the compute device 300 includes a scheduler agent 310, one or more VM-CPEs 320 (including the VM-CPE 322), a memory 370, and a processor 330. In some embodiments, the compute device 300 can include more modules and/or components than those shown in FIG. 2, which are associated with instantiating, de-instantiating, and/or executing VM-CPE(s) for the switch fabric system. In some embodiments, the compute device 300 can also be included in a data plane of the switch fabric system, and associated with transmitting data in the switch fabric system.

Similar to the memory 270 of the control device 200 described above with respect to FIG. 2, the memory 370 can be, for example, a RAM (e.g., a dynamic RAM, a static RAM), a flash memory, a removable memory, and/or so forth. In some embodiments, the memory 370 can include and/or store, for example, a database, process code, application code, method code, and/or some other software modules (stored and/or executing in hardware) or hardware modules associated with the control plane functions and/or the data plane functions performed by the compute device 300. In such embodiments, instructions and/or methods associated with those control plane functions and/or data plane functions can be stored within the memory 370 and executed at the processor 330.

Similar to the processor 230 of the control device 200 described above with respect to FIG. 2, the processor 330 can be any processor configured to, for example, write data into and read data from the memory 370, and execute the instructions and/or methods stored within the memory 370. Furthermore, the processor 330 can be configured to control operation of the modules and/or components of the compute device 300, including the scheduler agent 310. The processor 330 can also be configured to execute the VM-CPE(s) 320. In some embodiments, under the control of the processor 330 and based on the instructions and/or methods stored within the memory 370, the scheduler agent 310 can be configured to instantiate and/or de-instantiate VM-CPE (s), and the VM-CPE(s) 320 can be executed and maintained at the compute device 300.

The scheduler agent 310 can include a combination of hardware and/or software (stored and/or executing in hardware) capable of performing one or more specific functions associated with scheduling VM-CPE(s) at the compute device 300. In some embodiments, the scheduler agent 310 can include, for example, a FPGA, an ASIC, a DSP, and/or the like. In some embodiments, the scheduler agent 310 can be configured to receive a control signal 352 from, for example, a control device (e.g., the control device 200 in FIG. 2) that is operatively coupled to the compute device 300 and controls the compute devices (including the compute device 300) of the control plane. The control signal 352 can be associated with, for example, designating a control plane entity as a VM-CPE at the compute device 300, de-instantiating a VM-CPE 320 that is executed at the compute device 300, and/or the like.

In response to receiving such a control signal, the scheduler agent 310 can be configured to configure a virtual machine at the compute device 300, such that the designated control plane entity can be instantiated as a VM-CPE (e.g., the VM-CPE 322) at the compute device 300, shown as the signal 354 in FIG. 3. A VM-CPE 320 can be a process, application, virtual machine, and/or some other software module (executing in hardware) or a combination of software and hardware modules that is associated with providing a control service and is executed at the compute device 300. In some embodiments, the compute device 300 can be dedicated to hosting the VM-CPE(s) 320. In other words, the compute device 300 can allocate all or substantially all of its computing resources (e.g., processing capacity, storage capacity, etc.) to the VM-CPE(s) 320. In some embodiments, the compute device 300 can host other processes, applications, virtual machines, and/or software modules (executing in hardware) in addition to the VM-CPE(s) 320. For example, the compute device 300 can be a general purpose compute device or a compute node that is configured to host multiple processes, applications, virtual machines, and/or software modules.

Returning to FIG. 1, the control devices 112 and 114 can be configured to collectively control and monitor operation of the compute devices in the control plane 170, including the compute devices 122, 124 and 126. In some embodiments, one of the control devices 112 and 114 can function as a primary control device, and the other can function as a backup control device. In such embodiments, the primary control device can be configured to, for example, handle requests (e.g., sent from other devices, generated within the control device(s)) when the primary control device has the required resources (e.g., processing capability, memory), and the backup control device can be configured to handle requests when the primary control device does not have the required resources (e.g., the primary control device is fully occupied by other requests). For example, the control device 112 can function as a primary control device for the control plane 170, and the control device 114 can function as a backup control device for the control plane 170. In some other embodiments, the control devices 112 and 114 do not operate in a primary/backup fashion. For example, the control devices 112 and 114 can each independently handle requests that are received or generated at that control device.

In some embodiments, a request associated with providing a control service (e.g., a routing protocol, a packet-forwarding scheme, an error recovery mechanism, etc.) by the control plane 170 can be received at, for example, a virtualization API (not shown in FIG. 1) of the control device 112. The virtualization API can be similar to the virtualization API 210 of the control device 200 shown and described with respect to FIG. 2. In some embodiments, such a request can be sent from a device (not shown in FIG. 1) other than the control device 112 (e.g., another control device, a compute device) via the signal 142. In some other embodiments, such a request can be generated within the control device 112, e.g., at a component of the control device 112 other than the virtualization API or the scheduler 113. In yet some other embodiments, such a request can be provided as a command from, for example, a network administrator or operator of the switch fabric system 100. In response to receiving such a request, the virtualization API can be configured to transform the request into a control plane request associated with providing the corresponding control service. The virtualization API can then be configured to send the control plane request to the scheduler 113 of the control device 112.

In some embodiments, the scheduler 113 of the control device 112 can be configured to receive state information of one or more VM-CPEs from the set of VM-CPEs associated with the control plane 170. The set of VM-CPEs can be similar to the VM-CPEs 320 shown and described with respect to FIG. 3. Specifically, each VM-CPE from the set of VM-CPEs is a control plane entity that is instantiated as a virtual machine at a compute device 120 that is included in the control plane 170. For example, the scheduler 113 can be configured to receive state information of one or more VM-CPEs (not shown in FIG. 1) instantiated at the compute devices 124 and 126, via the signals 162 and 163 as shown in FIG. 1.

In some embodiments, the state information of a VM-CPE can be associated with, for example, resource consumption (e.g., processor consumption, storage consumption) of that VM-CPE, operative status (e.g., operative or not operative) of the compute device hosting the VM-CPE, and/or the like. For example, the scheduler 113 can receive state information from a VM-CPE (not shown in FIG. 1) instantiated at the compute device 124 indicating the VM-CPE is consuming 10% of the processor resource of the compute device 124. For another example, the scheduler 113 can receive state information from a VM-CPE (not shown in FIG. 1) instantiated at the compute device 126 indicating the compute device 126 is not operative.

In response to receiving the control plane request associated with providing the control service from the virtualization API of the control device 112, the scheduler 113 can be configured to designate a control plane entity based on the state information received from the VM-CPE(s) instantiated at the compute devices 124 and 126. The control plane entity is designated at the scheduler 113 such that the designated control plane entity can be configured to provide the requested control service when the designated control plane entity is instantiated as a virtual machine at a compute device.

In some embodiments, each control plane entity that is instantiated as a virtual machine (i.e., a VM-CPE) at a compute device within the control plane 170 is associated with an affinity attribute value and/or an anti-affinity attribute value. In some embodiments, each VM-CPE from a group of VM-CPEs is associated with an affinity attribute value and/or an anti-affinity attribute value. VM-CPEs from the group of VM-CPEs can be considered closely related in the sense that they provide redundancy for a common functionality (e.g., a control service). These VM-CPEs have some policy requirements for their placement. In some embodiments, such a group of VM-CPEs that require redundancy is called a redundancy group and has an associated redundancy-group-name. In some embodiments, the affinity attribute values and anti-affinity attribute values of the VM-CPEs can be collected and stored as state information at or accessible by the scheduler 113.

In some embodiments, an affinity attribute value associated with a VM-CPE is used to identify the criticality of hosting and executing the VM-CPE at a compute device together with other VM-CPE(s). For example, the closer the affinity attribute value of the VM-CPE is to the affinity attribute value of another VM-CPE, the more critical the two VM-CPEs are hosted and executed together at the same compute device. In some embodiments, an anti-affinity attribute value associated with a VM-CPE is used to identify the criticality of hosting and executing the VM-CPE at a different compute device from the compute device(s) that host other VM-CPE(s). For example, the closer the anti-affinity attribute value of the VM-CPE is to the anti-affinity attribute value of another VM-CPE, the more critical the two VM-CPEs are hosted and executed at separate compute devices. In other words, the affinity attribute value and/or the anti-affinity attribute value associated with the VM-CPEs represents the criticality of or preference for hosting and executing the VM-CPEs on the same or different compute devices. In a way, this is a specific form of policy specification to instantiate VM-CPEs.

In some embodiments, VM-CPEs from a redundancy group can share an anti-affinity attribute value, which gives the degree of importance to host those VM-CPEs on redundant compute devices. For example, the larger the anti-affinity attribute value of a redundancy group, the higher is the preference to host and execute the VM-CPEs of the redundancy group on redundant compute devices compared to other VM-CPEs in another redundancy group. In some embodiments, if the anti-affinity attribute value of a redundancy group is equal to, for example, an INFINITE ANTI AFFINITY value, the VM-CPEs in this redundancy group must be hosted on redundant compute devices, failing which the VM-CPEs will not be instantiated.

In some embodiments, in response to the received control plane request, the scheduler 113 can be configured to designate a control plane entity such that the control plane entity is associated with an affinity attribute value and/or an anti-affinity attribute value. In some embodiments, the affinity attribute value and/or anti-affinity attribute value for the designated control plane entity can be determined at the scheduler 113 based on state information of the VM-CPEs that is collected and stored at or accessible by the scheduler 113. The state information of the VM-CPEs can include, for example, the affinity attribute values and anti-affinity attribute values of the VM-CPEs, information associated with available resource and/or operative status of the compute devices (e.g., compute devices 124 and 126) that host the VM-CPEs, and/or so forth.

For example, the state information collected and stored at or accessible by the scheduler 113 indicates that a first control plane entity should be instantiated and executed at the same compute device with a second control plane entity that has been instantiated at that compute device. Based on such state information, the scheduler 113 can be configured to assign an affinity attribute value to the first control plane entity, which is corresponding to (e.g., equal to) the affinity attribute value of the second control plane entity. As a result, the first control plane entity can be instantiated at the compute device hosting and executing the second control plane entity.

For another example, the control plane request received at the scheduler 113 indicates that a first control plane entity should be instantiated and executed at a different compute device than the compute device with a second control plane entity that has been instantiated at that compute device. Based on such a control plane request, the scheduler 113 can be configured to assign an anti-affinity attribute value to the first control plane entity, which is corresponding to (e.g., equal to) the anti-affinity attribute value of the second control plane entity. As a result, the first control plane entity can be instantiated at a compute device different than the compute device hosting and executing the second control plane entity.

In some embodiments, the scheduler 113 can be configured to select a compute device from the set of compute devices 120 within the control plane 170 of the switch fabric system 100. The compute device is selected to instantiate the designated control plane entity as a virtual machine (i.e., to host and execute a VM-CPE). In some embodiments, the compute device can be selected based on, for example, the affinity attribute value and the anti-affinity attribute value of the designated control plane entity, the affinity attribute value and the anti-affinity attribute value of each VM-CPE from the set of VM-CPEs, other state information associated with the VM-CPEs and/or the compute devices (e.g., compute devices 124 and 126), and/or so forth.

Assuming the compute device 122 is selected by the scheduler 113, the scheduler 113 can be configured to send a signal 161 to the compute device 122 such that the designated control plane entity can be instantiated at the compute device 122 to become, for example, VM-CPE 132 associated with providing the requested control service. As a result, the resulting VM-CPE 132 is hosted and executed at the compute device 122, and provides the control service requested by the control plane request for the switch fabric system 100.

In some embodiments, the signal 161 can contain information used to instantiate the VM-CPE 132 such as, for example, an identifier of the instantiator of the VM-CPE 132 (i.e., the scheduler 113); data used to instantiate the VM-CPE 132, which can include type of platform, UUID (universally unique identifier) of the virtual machine, identifier of switching device(s) within the network, preference for VM-CPE mastership, information associated with the redundancy group for the VM-CPE, and/or the like. In some embodiments, information associated with the redundancy group of the VM-CPE can include, for example, redundancy-group-name, instantiation-preference, running preference (de-instantiation de-preference), group-local-running priority (described below with respect to FIG. 4), etc.

Additionally, in some embodiments, information and parameters that can be used in creating and instantiating a VM-CPE, and/or selecting a compute device to instantiate the VM-CPE can include, for example, an instantiation-preference and a de-instantiation de-preference of the VM-CPE; information of resources including processor requirements (processor speed, number of processor threads), memory requirements (RAM speed, average RAM space, peak RAM space, peak swap space), storage requirements (disk IOps (Input/Output operations per second), average disk space peak disk space), hardware assist (hardware watchdog and watchdog action), processor with virtualization support; affinity attribute value and anti-affinity attribute value; etc.

In some embodiments, based on a control plane request and/or changes in state information that are received at the scheduler 113, the scheduler 113 can be configured to modify a VM-CPE that is instantiated and executed at a compute device within the control plane 170. Specifically, the scheduler 113 can be configured to, for example, de-instantiate, delete, move the VM-CPE, or change the parameter(s) of the VM-CPE. In such embodiments, similar to instantiating a VM-CPE, the scheduler 113 can be configured to send a signal containing information associated with modifying the VM-CPE to the corresponding compute device. For example, if the collected state information indicates that the compute device 124 no longer has the required resources to execute a VM-CPE, the scheduler 113 can be configured to send a signal to the compute device 124 such that VM-CPE can be de-instantiated or deleted at the compute device 124.

In some embodiments, to delete a VM-CPE at a compute device, a single parameter of UUID of that VM-CPE can be passed to the compute device. As a result, the VM-CPE can be identified based on the UUID and then deleted from the compute device. In some embodiments, a scheduler can be configured to update data associated with a VM-CPE executed at a compute device, such as an image. For example, the scheduler can be configured to pass the UUID of that VM-CPE and a full path of a new image to the compute device. As a result, the VM-CPE can be identified based on the UUID and then its image can be replaced by the new image at the compute device. In some embodiments, to move a VM-CPE from a first compute device to a second compute device, the VM-CPE can be de-instantiated from the first compute device and instantiated at the second compute device. Further details of modifying parameters of a VM-CPE and moving a VM-CPE are shown and described with respect to FIG. 4.

Figure 4:
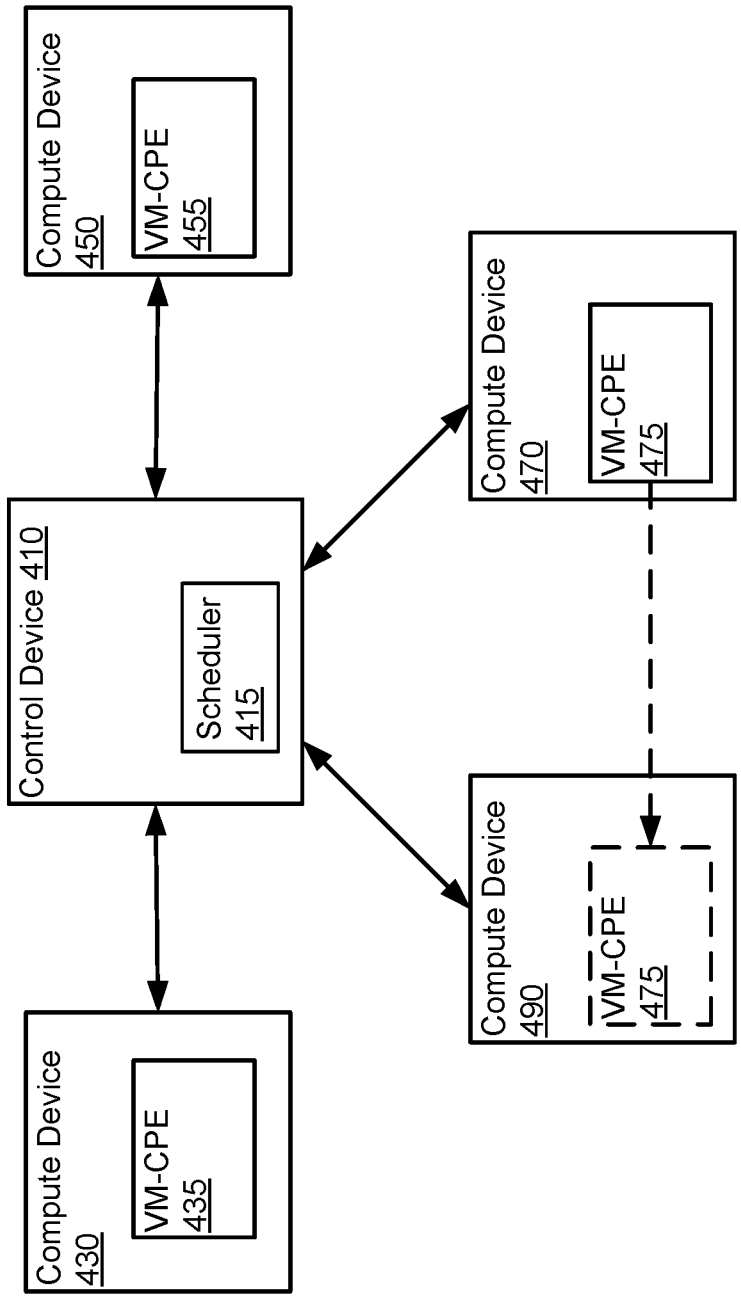
FIG. 4 is a schematic illustration of a control device configured to manage multiple virtual machines at compute devices, according to an embodiment.

FIG. 4 is a schematic illustration of a control device 410 configured to manage multiple virtual machines at compute devices, according to an embodiment. The control device 410 is structurally and functionally similar to the control devices 112, 114 and 200 shown and described with respect to FIGS. 1 and 2. The control device 410 includes a scheduler 415 that is similar to the schedulers 113 and 220 shown and described with respect to FIGS. 1 and 2. The control device 410 can be associated with a control plane within a switch fabric system that is similar to the control plane 170 within the switch fabric system 100 in FIG. 1.

The control device 410 is operatively coupled to compute devices 430, 450, 470 and 490, which are structurally and functionally similar to the compute devices 122, 124, 126 and 300 that are shown and described with respect to FIGS. 1 and 3. Furthermore, the compute devices 430, 450, 470 and 490 are associated with the control plane, and can host and execute VM-CPE(s). For example, as shown in FIG. 4, the compute devices 430, 450 and 470 host and execute VM-CPEs 435, 455 and 475, respectively. The VM-CPEs hosted at the compute devices 435, 450, 470 and 490 can be designated, scheduled and caused to be instantiated by the scheduler 415 of the control device 410.

In some embodiments, in response to a control plane request associated with requesting a control service that is received at the scheduler 415, the scheduler 415 can be configured to designate a group of control plane entities. Each control plane entity from the group of control plane entities is associated with providing the requested control service. In such embodiments, the group of control plane entities (e.g., a pair of control plane entities) designated by the scheduler 415 includes redundant control plane entities. In the process of designating and/or instantiating redundant control plane entities, the scheduler 415 can be configured to assign a priority attribute value to each control plane entity from the redundant control plane entities. In some other embodiments, a priority attribute value can be assigned to each control plane entity from a set of control plane entities that are associated with different control services (i.e., not redundant control plane entities). In some embodiments, the scheduler 415 can be configured to instantiate redundant control plane entities at different compute devices. In other embodiments, more than one redundant control plane entities can be instantiated at a common compute device. Additionally, in some embodiments, the priority attribute value of a control plane entity (or equivalently, a VM-CPE) is known as a group-local-priority of the control plane entity (or the VM-CPE).

The priority attribute value of a control plane entity or a resulting VM-CPE can be used to indicate a priority or preference for the corresponding control plane entity to be instantiated, or the resulting VM-CPE to be executed, at a compute device. In some embodiments, a control plane entity with a higher priority attribute value has a higher priority or preference to be instantiated (e.g., instantiated earlier) than a control plane entity with a lower priority attribute value. Similarly, a VM-CPE with a higher priority attribute value has a higher priority or preference to consume resources (e.g., processing capability, storage capacity, etc.) of the compute device to execute that VM-CPE than a VM-CPE with a lower priority attribute value.

In some embodiments, one of two priority attribute values of a redundant pair of control plane entities (or VM-CPEs) is a primary value, and the other of the two priority attribute values of the redundant pair of control plane entities (or VM-CPEs) is a secondary value. In some embodiments, the higher priority attribute value from the two priority attribute values is the primary value, which indicates a relatively higher priority or preference for the corresponding control plane entity to be instantiated and/or the corresponding VM-CPE to be executed at a compute device; and the lower priority attribute value from the two priority attribute values is the secondary value, which indicates a relatively lower priority or preference for the corresponding control plane entity to be instantiated and/or the corresponding VM-CPE to be executed at a compute device.

For example, a pair of redundant control plane entities can be instantiated at the compute devices 430 and 450 as VM-CPEs 435 and 455, respectively. Each of the VM-CPEs 435 and 455 is assigned a priority attribute value, and the priority attribute value assigned to the VM-CPE 435 is higher than that assigned to the VM-CPE 455. Thus, the priority attribute value of the VM-CPE 435 is the primary value, and the priority attribute value of the VM-CPE 455 is the secondary value. As a result, the VM-CPE 435 is instantiated earlier than the VM-CPE 455. For another example, each of a group of redundant VM-CPEs 435, 455 and 475 is assigned a priority attribute value. The priority attribute value of the VM-CPE 435 is the highest of the three priority attribute values, and the priority attribute value of the VM-CPE 475 is the lowest of the three priority attribute values. As a result, the VM-CPE 435 is provided with relatively the most resources compared with the other two VM-CPEs 455 and 475, as the execution of the VM-CPE 435 is the priority of the three VM-CPEs. Meanwhile, the VM-CPE 475 is provided with relatively the least resources compared with the other two VM-CPEs 435 and 455.

In some embodiments, priority attribute values (e.g., primary and secondary values) of VM-CPEs can be determined through, for example, a mastership election process (e.g., selection of the VM-CPE instantiated first, the VM-CPE instantiated the longest, etc.). In such embodiments, for example, a master VM-CPE and a backup VM-CPE can be determined from a pair of redundant VM-CPEs through the mastership election. Based on the mastership election result, a primary value can be determined for the VM-CPE, and a secondary value can be determined for the backup VM-CPE. In some embodiments, initial priority attribute values can be assigned to each VM-CPE from a group of redundant VM-CPE. After a mastership election, the VM-CPEs can be ranked based on a priority (or preference) order as a result of the mastership election. Thus, the initial priority attribute value of each VM-CPE can be modified accordingly based on the resulted priority (or preference) order, such that a VM-CPE with a higher priority (or preference) has a higher priority attribute value.

In some embodiments, the scheduler 415 can be configured to modify parameters (e.g., priority attribute value) of the VM-CPEs based on a control plane request and/or state information of the VM-CPEs that is received at the control device 410. Particularly, the scheduler 415 can be configured to modify priority attribute value(s) of one or more VM-CPEs of a redundancy group in response to a change in a VM-CPE that is from the same redundancy group. In some embodiments, such a change can be caused by, for example, the compute device hosting the VM-CPE being inoperative, the VM-CPE being erroneous or de-instantiated, and/or the like. In some embodiments, to modify a priority attribute value of a VM-CPE hosted at a compute device, the scheduler 415 can be configured to pass the UUID of the VM-CPE and a new priority attribute value to the compute device. The VM-CPE can be identified at the compute device based on its UUID, and then the priority attribute value of the VM-CPE can be updated to the new priority attribute value.

For example, the VM-CPEs 435 and 455 are in the same redundancy group. The VM-CPE 435 can have a priority attribute value 90, and the VM-CPE 455 can have a priority attribute 50. The scheduler 415 can be configured to receive a signal indicating, for example, that the compute device 430 is not operative. In response to receiving the signal, the scheduler 415 can be configured to send a signal to the compute device 450 to increase the priority attribute value of the VM-CPE 455 to, for example, 80. In some embodiments, the priority attribute value of the VM-CPE 455 can be increased to a value (e.g., 100) higher than the previous priority attribute value (i.e., 90) of the VM-CPE 435 when the compute device 430 was operative.

For another example, the VM-CPEs 435, 455 and 475 can be in the same redundancy group. The VM-CPE 435 can have a priority attribute value 100, the VM-CPE 455 can have a priority attribute 50, and the VM-CPE 475 can have a priority attribute value 10. The scheduler 415 can be configured to receive a signal indicating, for example, that the compute device 430 is not operative. In response to receiving the signal, the scheduler 415 can be configured to send a signal to the compute device 450 to increase the priority attribute value of the VM-CPE 455 to, for example, 100; and send another signal to the compute device 470 to increase the priority attribute value of the VM-CPE 475 to, for example, 60. In some embodiments, the priority attribute values of the VM-CPEs 455 and 475 can be increased to different new values such that the resulted priority attribute value (e.g., 100) for the VM-CPE 455 is still higher than the resulted priority attribute value (e.g., 60) for the VM-CPE 475.

In some embodiments, the scheduler 415 can be configured to move a VM-CPE from a first compute device to a second compute device based on a control plane request and/or state information of the VM-CPEs that is received at the control device 410. Specifically, the scheduler 415 can be configured to de-instantiate the VM-CPE at the first compute device and instantiate the VM-CPE at the second compute device. In some embodiments, such a move can be caused by, for example, the resources of the compute device being depleted, the VM-CPE requesting more resources, a requirement associated with affinity attribute values and/or anti-affinity attribute values, and/or the like.

For example, the VM-CPE 475 can be executed at the compute device 470. The scheduler 415 can be configured to receive a control plane request that requests the VM-CPE 475 to be executed at the compute device 490. In response to receiving the control plane request, the scheduler 415 can be configured to send a signal to the compute device 470 to de-instantiate the VM-CPE 475 from the compute device 470, and send another signal to the compute device 490 to instantiate the VM-CPE 475 at the compute device 490. As a result, the VM-CPE 475 is moved from the compute device 470 to the compute device 490, as shown in FIG. 4.

FIG. 5 is a flow chart illustrating a method 500 for instantiating a control plane entity, according to an embodiment. The method 500 can be executed at, for example, a scheduler of a control device that is similar to the scheduler 113 of the control device 112 in FIG. 1, the scheduler 220 of the control device 200 in FIG. 2, and the scheduler 415 of the control device 410 in FIG. 4.

The method 500 includes receiving a control plane request associated with a switch fabric system having a data plane and a control plane separate from the data plane, at 502. The data plane and the control plane of the switch fabric system are similar to the data plane 180 and the control plane 170 of the switch fabric system 100 in FIG. 1. The control plane includes the control device and a set of compute devices. The control plane request can be associated with, for example, providing a control service in the control plane of the switch fabric system. The control plane request can be received at the scheduler of the control device.

The method 500 includes designating a control plane entity based on the control plane request and state information of each control plane entity from a set of control plane entities associated with the control plane and instantiated as a virtual machine, at 504. As described above with respect to FIGS. 1-4, the set of control plane entities can be instantiated as VM-CPEs, and then executed at the compute devices in the control plane. The scheduler of the control device can be configured to collect state information of the VM-CPEs. The collected state information of a VM-CPE can include, for example, resource consumption (e.g., processor consumption, storage consumption) of that VM-CPE, operative status (e.g., operative or not operative) of the compute device hosting the VM-CPE, and/or the like.

The scheduler of the control device can be configured to designate a control plane entity based on the control plane request and state information of the VM-CPEs. In some embodiments, each instantiated VM-CPE is associated with an affinity attribute value, an anti-affinity attribute value, and/or other parameters (e.g., a priority attribute value). In such embodiments, when the control plane entity is designated at the scheduler of the control device, the scheduler is configured to assign an affinity attribute value and/or an anti-affinity attribute value to that control plane entity.

The method 500 further includes sending a signal to a compute device of the switch fabric system in response to the control plane request such that the control plane entity is instantiated as a virtual machine at the compute device, at 506. In some embodiments, the compute device, to which the signal is sent to, can be selected from a set of compute devices at least in part on the affinity attribute value and/or the anti-affinity attribute value of the control plane entity and of each VM-CPE from the set of VM-CPEs that are instantiated in the control plane. The scheduler of the control device can then be configured to send the signal to the selected compute device, such that the designated control plane entity is instantiated as a VM-CPE at the selected compute device. In some embodiments, as described above with respect to FIG. 4, the scheduler can be further configured to de-instantiate, delete, move the VM-CPE, and/or modify parameters of the VM-CPE in response to a control plane request and/or based on changes in the collected state information of the VM-CPEs in the control plane.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory, processor-readable medium storing code representing instructions to be executed by a processor, the code comprising code to cause the processor to:
receive a control plane request;
designate a first control plane entity based on the control plane request and state information of each control plane entity from a plurality of control plane entities, each control plane entity from the plurality of control plane entities being instantiated as a virtual machine from a plurality of virtual machines, the state information associating the first control plane entity with a second control plane entity (1) from the plurality of control plane entities and (2) instantiated at a compute device as a first virtual machine from the plurality of virtual machines, the state information including a first set of values indicating a proximity preference that the first control plane entity is executed at the compute device, the state information including a second set of values indicating a proximity preference that the first control plane entity is executed at a redundant compute device different from the compute device; and
send a signal to the compute device, in response to the control plane request and when a value from a subset of the first set of values that is associated with the first control plane entity and the second control plane entity is larger than a value from a subset of the second set of values that is associated with the first control plane entity and the second control plane entity, such that the first control plane entity is instantiated at the compute device as a second virtual machine from the plurality of virtual machines.

2. The non-transitory, processor-readable medium of claim 1, wherein:
the first set of values includes a set of affinity values, and
the subset of the first set of values includes (1) an affinity value of the first control plane entity and included in the set of affinity values, and (2) an affinity value of the second control plane entity and included in the set of affinity values.

3. The non-transitory, processor-readable medium of claim 1, wherein:
the second set of values includes a set of anti-affinity values, and
the subset of the first set of values includes (1) an affinity value of the first control plane entity and included in the set of anti-affinity values, and (2) an affinity value of the second control plane entity and included in the set of anti-affinity values.

4. The non-transitory, processor-readable medium of claim 1, wherein:
the first set of values includes a set of affinity values, the subset of the first set of values includes (1) an affinity value of the first control plane entity and included in the set of affinity values, and (2) an affinity value of the second control plane entity and included in the set of affinity values,
the second set of values includes a set of anti-affinity values, the subset of the second set of values includes (1) an anti-affinity value of the first control plane entity and included in the set of anti-affinity values, and (2) an anti-affinity value of the second control plane entity, and the determination of whether the value from the subset of the first set of values is larger than the value from the subset of the second set of values is based on a comparison of a difference between the affinity value of the first control plane entity and the affinity value of the second control plane entity, with a difference between the anti-affinity value of the first control plane entity and the anti-affinity value of the second control plane entity.

5. The non-transitory, processor-readable medium of claim 1, wherein:
the first set of values includes a set of affinity values, the subset of the first set of values includes an affinity value (1) of a redundancy group associated with the first control plane entity and the second control plane entity, and (2) included in the set of affinity values,
the second set of values includes a set of anti-affinity values, the subset of the second set of values includes an anti-affinity value (1) of the redundancy group associated with the first control plane entity and the second control plane entity and (2) included in the set of anti-affinity values,
the determination of whether the value from the subset of the first set of values is larger than the value from the subset of the second set of values is based on a comparison of the value of the affinity value and the anti-affinity value, and
the signal is sent when the comparison indicates that the affinity value is larger than the anti-affinity value.

6. The non-transitory, processor-readable medium of claim 1, wherein:
the code to designate includes code to designate the first control plane entity such that the first control plane entity is associated with a priority attribute value;
the second control plane entity is associated with a priority attribute value; and
one of the priority attribute value of the first control plane entity or the priority attribute value of the second plane entity is a primary value and the remaining attribute value of the first control plane entity or the priority attribute value of the second control plane entity is a secondary value.

7. A method, comprising:
receiving a signal designating a first control plane entity associated with a control plane, the first control plane entity having been designated based on a control plane request and state information of each control plane entity from a plurality of control plane entities associated with the control plane, the state information including a first set of values indicating a proximity preference that a second control plane entity from the plurality of control plane entities is executed at a first compute device, the state information including a second set of values indicating a proximity preference that the second control plane entity is executed at a second compute device different from the first compute device;
configuring a virtual machine corresponding to the first control plane entity on the first compute device in response to the signal; and
configuring a virtual machine corresponding to the second control plane entity on the first compute device based on a comparison of a subset of the first set of values and a subset of the second set of values.

8. The method of claim 7, wherein:
the first set of values includes a set of affinity values, and
the subset of the first set of values includes (1) an affinity value of the first control plane entity and included in the set of affinity values and (2) an affinity value of the second control plane entity and included in the set of affinity values.

9. The method of claim 7, wherein:
the second set of values includes a set of anti-affinity values, and
the subset of the first set of values includes (1) an anti-affinity value of the first control plane entity and included in the set of anti-affinity values and (2) an anti-affinity value of the second control plane entity and included in the set of anti-affinity values.

10. The method of claim 7, wherein:
the first set of values includes a set of affinity values, the subset of the first set of values includes (1) an affinity value of the first control plane entity and included in the set of affinity values and (2) an affinity value of the second control plane entity and included in the set of affinity values,
the second set of values includes a set of anti-affinity values, the subset of the second set of values includes (1) an anti-affinity value of the first control plane entity and included in the set of anti-affinity values and (2) an anti-affinity value of the second control plane entity and included in the set of anti-affinity values, and
the comparison of the subset of the first set of values and the subset of the second set of values being based on a comparison of a difference between the affinity value of the first control plane entity and the affinity value of the second control plane entity, with a difference between the anti-affinity value of the first control plane entity and the anti-affinity value of the second control plane entity.

11. The method of claim 7, wherein:
the first set of values includes a set of affinity values, the subset of the first set of values includes an affinity value (1) of a redundancy group associated with the first control plane entity and the second control plane entity, and (2) included in the set of affinity values,
the second set of values includes a set of anti-affinity values, the subset of the second set of values includes an anti-affinity value (1) of a redundancy group associated with the first control plane entity and the second control plane entity, and (2) included in the set of anti-affinity values,
the comparison of the subset of the first set of values and the subset of the second set of values being based on a comparison of the value of the affinity value and the anti-affinity value, and
the signal is sent when the comparison indicates that the affinity value is larger than the anti-affinity value.

12. The method of claim 7, wherein the state information is associated with resource consumption of a virtual machine control plane entity (VM-CPE) hosted by the compute device.

13. The method of claim 7, wherein the state information includes information associated with an available resource and an operative status of the compute device.

14. A non-transitory, processor-readable medium storing code representing instructions to be executed by a processor, the code comprising code to cause the processor to:
receive a signal designating a first control plane entity based on a control plane request and state information of each control plane entity from a plurality of control plane entities, the state information including an affinity value associated with the second control plane entity and indicating a proximity preference that a second control plane entity from the plurality of control plane entities is executed at a first compute device, the state information including an anti-affinity value associated with the second control plane entity and indicating a proximity preference that the second control plane entity is executed at a second compute device different from the first compute device;
configure a virtual machine corresponding to the first control plane entity on the first compute device in response to the signal; and
configure a virtual machine corresponding to the second control plane entity on the first compute device when an affinity value associated with the first control plane entity and the affinity value associated with the second control plane entity are closer than an anti-affinity value associated with the first control plane entity and the anti-affinity value associated with the second control plane entity.

15. The non-transitory, processor-readable medium of claim 14, wherein the affinity value associated with the first control plane entity and the affinity value associated with the second control plane entity are determined to be closer than the anti-affinity value associated with the first control plane entity and the anti-affinity value associated with the second control plane entity when a difference between the affinity value associated with the first control plane entity and the affinity value associated with the second control plane entity is less than a difference between the anti-affinity value associated with the first control plane entity and the anti-affinity value associated with the second control plane entity.

16. The non-transitory, processor-readable medium of claim 14, wherein the virtual machine corresponding to the first control plane entity hosts a virtual machine control plane entity (VM-CPE) configured to provide a control service.

17. The non-transitory, processor-readable medium of claim 14, wherein the virtual machine corresponding to the first control plane entity hosts a plurality of virtual machine control plane entities (VM-CPEs) configured to provide redundancy for a control service.

18. The non-transitory, processor-readable medium of claim 14, wherein the code further comprises code to cause the processor to:
modify a virtual machine control plane entity (VM-CPE) hosted by the virtual machine corresponding to the first control plane entity and based on the control plane request and modified state information.

19. The non-transitory, processor-readable medium of claim 14, wherein the state information includes information associated with an available resource and an operative status of the first compute device.

20. The non-transitory, processor-readable medium of claim 14, wherein the state information is associated with resource consumption of a virtual machine control plane entity (VM-CPE) hosted by the first compute device.

* * * * *